United States Patent [19]

Sorensen

[11] Patent Number: 5,423,353

[45] Date of Patent: Jun. 13, 1995

[54] HOSE

[76] Inventor: Jeff Sorensen, 2831 Sooke Road, Victoria, B.C., Canada, V9B 1Y8

[21] Appl. No.: 123,355

[22] Filed: Sep. 17, 1993

[51] Int. Cl.⁶ .............................................. F16L 39/02
[52] U.S. Cl. .................................... 138/109; 138/119; 138/113
[58] Field of Search ............... 138/111, 113, 114, 112, 138/109, 115, 118, 119; 285/133.1, 133.2

[56] References Cited

U.S. PATENT DOCUMENTS

| | | | |
|---|---|---|---|
| 3,464,450 | 9/1969 | Steffenini | 138/172 |
| 3,665,967 | 5/1972 | Kachnik | 138/30 |
| 4,014,369 | 3/1977 | Kobres, Jr. | 138/112 |
| 4,341,392 | 7/1982 | van Dongeren | 138/148 |
| 4,906,496 | 3/1990 | Hosono et al. | 138/113 |
| 4,922,971 | 5/1990 | Grantham | 138/113 |
| 4,930,544 | 6/1990 | Ziu | 138/113 |
| 5,156,191 | 10/1992 | Walker et al. | 138/113 |
| 5,186,502 | 2/1993 | Martin | 138/112 |
| 5,203,378 | 3/1993 | Williams | 138/113 |

FOREIGN PATENT DOCUMENTS 558071  9/1993  Netherlands ......................... 138/119

Primary Examiner—David A. Scherbel
Assistant Examiner—Patrick F. Brinson
Attorney, Agent, or Firm—Brian M. Long

[57] ABSTRACT

A collapsible, self-priming hose has a flexible inner tube extending along the interior of the outer tube, which has a diameter sufficiently greater than that of the inner tube to provide an intermediate space between the inner and outer tubes upon inflation of the outer tube. Retainer members extending between and connected to the inner and outer tubes expand the inner tube from a collapsed condition upon inflation of the outer tube and are flexible to allow the hose to collapse on deflation of the inner and outer tubes.

2 Claims, 4 Drawing Sheets

HOSE

BACKGROUND OF THE INVENTION

1. Field of the Invention

The present invention relates to hoses and is useful in particular, but not exclusively, for suction hoses for use by fire departments and other emergency organizations.

2. Description of the Related Art

Conventional flexible suction hoses for use by fire departments and the like have a tubular structure which incorporates rigid circular rings or coils, with a flexible covering bonded to the rings or coils. The rings or coils maintain the cross-sectional shape of the hose, and in addition allow the hose to flex along its length, while the covering keeps the hose airtight.

It is a disadvantage of such prior art hoses that, when they are not in use, they still maintain their circular cross-sections and, therefore, are bulky and awkward to store and transport.

Furthermore, as the diameter of the hose or the strength of suction through the hose is increased, the hose must be made of correspondingly stiffer and heavier materials, which makes the hoses even more bulky and awkward.

BRIEF SUMMARY OF THE INVENTION

It is accordingly an object of the present invention to provide a novel and improved suction hose construction which does not require the use of rigid materials in the hose itself and which can be collapsed and compactly stored when not in use.

It is a further object of the present invention to provide a suction hose which, as it is inflated from a collapsed state, is virtually self-priming.

According to the present invention, there is provided a hose which comprises a flexible inner tube extending along the interior of a flexible outer tube, the outer tube having a diameter which is sufficiently greater than that of the inner tube to provide a gap between the inner and outer tubes upon inflation of the outer tube. A plurality of flexible retainer members connect the inner and outer tubes for expanding the inner tube from a collapsed condition upon inflation of the outer tube.

The retainer members preferably extend longitudinally of the inner and outer tubes and may be equidistantly spaced around the inner tube.

In use, a fluid under pressure, for example water frown a pump on a fire truck or a gas, is introduced into the hose in between the inner and outer tubes. The pressure of this fluid acts on the inner surface of the outer tube and the outer surface of the inner tube.

Since the surface area of the inner surface of the outer tube is larger than that of the outer surface of the inner tube, the resulting force acting outwardly on the outer tube is greater than that acting inwardly on the inner tube. Consequently, the outer tube is inflated and, as it changes from a collapsed condition to an inflated condition, the flexible retainer members are tensioned and, thereby, cause the inner tube to be converted from its collapsed condition to an expanded position.

BRIEF DESCRIPTION OF THE DRAWINGS

Further features, objects and advantages of the present invention will be more readily apparent from the following description thereof when taken in conjunction with the accompanying drawing, in which.

THE PREFERRED EMBODIMENT

Figure 1:
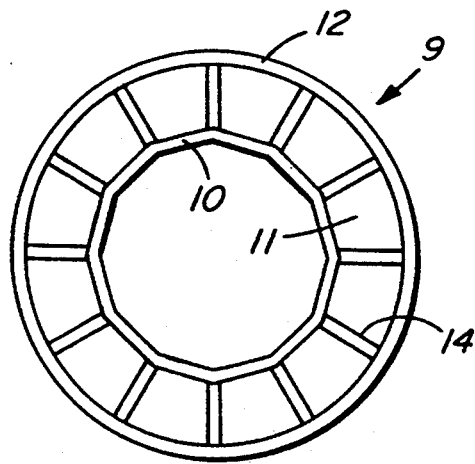
FIG. 1 shows a view in cross-section through a suction hose according to a first embodiment of the present invention.
Figure 2:
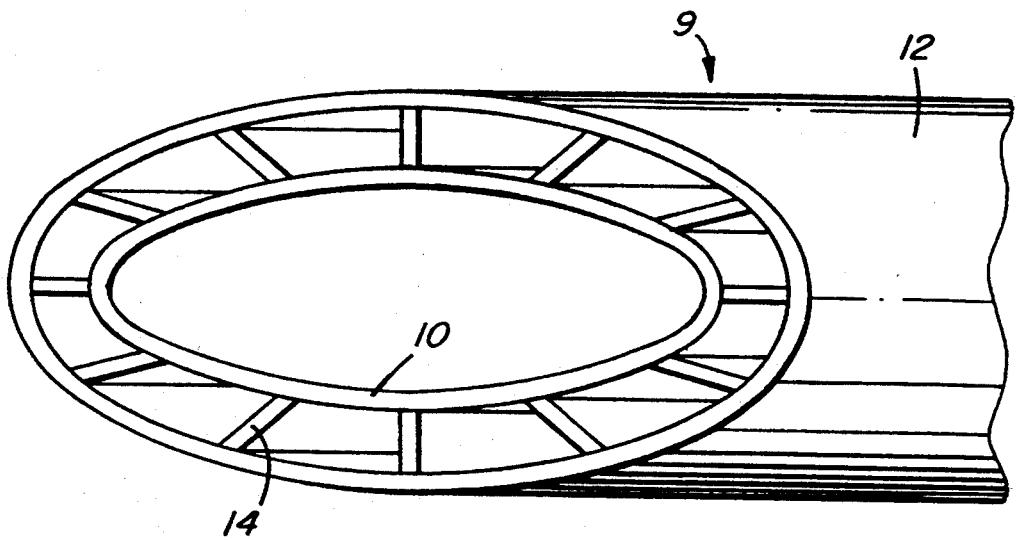
FIG. 2 shows a view in section through the suction hose of FIG. 1 at an angle of 45° to the longitudinal axis of the hose.

The suction hose illustrated in FIGS. 1 and 2 of the accompanying drawings and indicated generally by reference numeral 9 has an inner tube 10 which extends along the length of an outer tube 12, which is of greater diameter than the inner tube 10, with an intermediate space 11 between the tubes 10 and 12.

A plurality of flexible retainer members 14 are equidistantly spaced around the exterior of the inner tube 10 and extend between the inner tube 10 and the outer tube 12. The retainer members 14 are in the form of strips of material which extend longitudinally of the inner and outer tubes 10 and 14. More particularly, the inner and outer tubes 10 and 12 are formed of woven fabric, provided with a plastic or rubber coating, and the flexible retainer members 14 are also of canvas and are interwoven with the inner tube 10 and the outer tube 12 along opposite longitudinal sides of the flexible retainer members 14.

Figure 3:
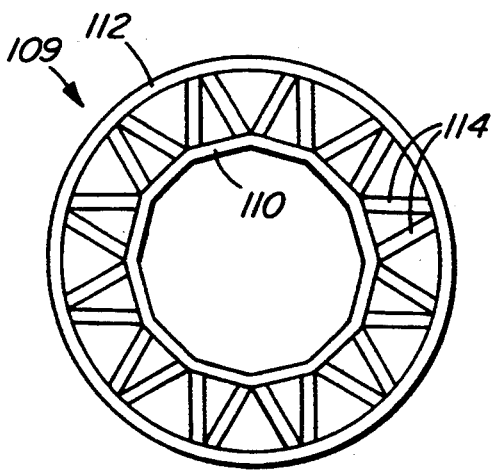
FIG. 3 shows a view in cross-section through a suction hose according to a second embodiment of the present invention.

In the embodiment of FIG. 3, in which parts corresponding to those of FIG. 2 have been indicated by the same reference numerals increased by 100, a hose indicated generally by reference numeral 109 has inner tube 110 connected to outer tube 112 by flexible retainer members 114, which are interwoven with the tubes 110 and 114 and arranged in pairs, as shown, with the flexible members 114 of each pair in a V-shaped configuration. Consequently, unlike the retainer members 14 of FIG. 1, which extend substantially radially of the inner and outer tubes 10 and 14, the retainer members 114 of FIG. 3 arc arranged in outwardly convergent, non-radially extending pairs.

FIGS. 4 through 7 show a female coupling indicated generally by reference numeral 20 and a male coupling indicated generally by reference numeral 22. The couplings 20 and 22 are provided at opposite ends of the hose 9, as described in greater detail below.

Figure 5:
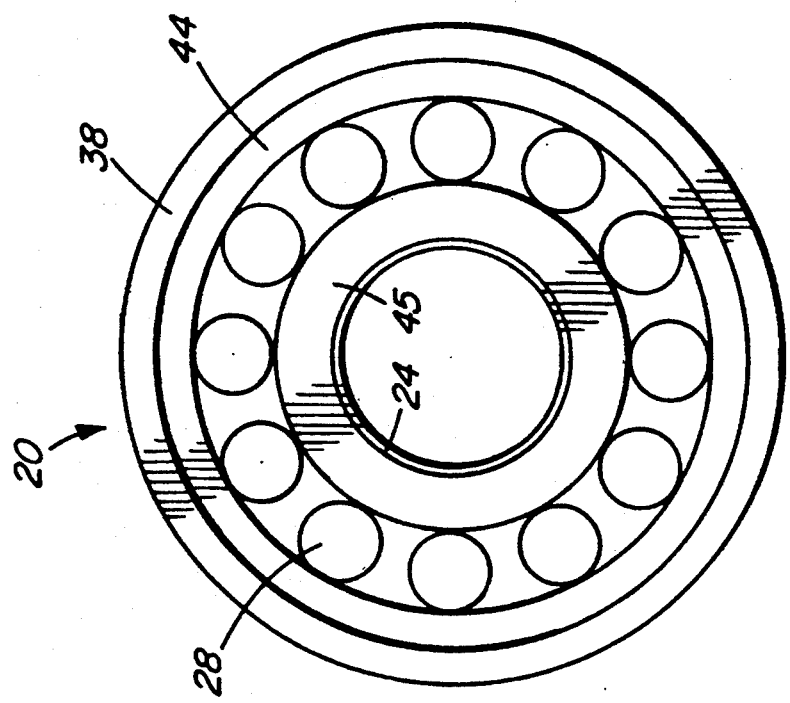
FIGS. 4 and 5 show views in longitudinal cross-section and in end elevation, respectively, of a female coupling for the hose of FIGS. 1 and 2 or 3.
Figure 4:
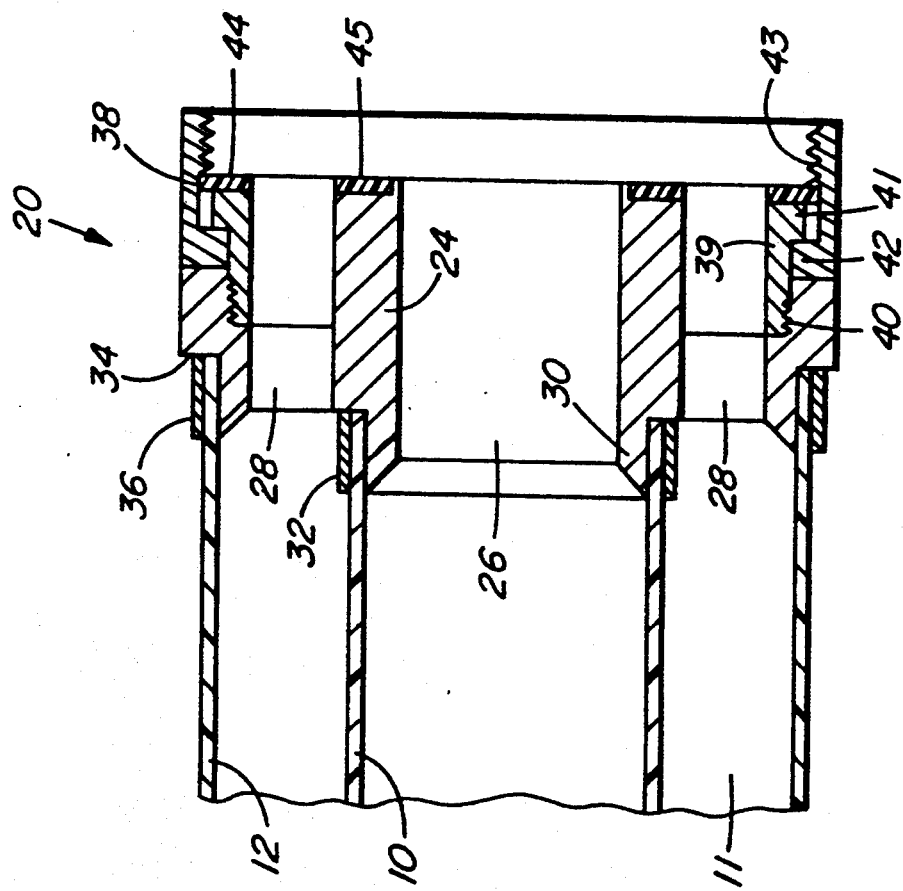

The female coupling 20, shown in FIGS. 4 and 5, has a coupling body 24, which is formed with a relatively large diameter central passage 26 and a plurality of relatively small diameter passages 28 which are equiangularly spaced around the central passage 26.

The central passage 26 extends through a cylindrical extension 30 which extends rearwardly, i.e. to the left as viewed in FIG. 4, beyond the passages 28. The inner tube 10 of the hose 9 is secured to the exterior surface of the extension 30 by a metal retainer ring 32 which is crimped around an end portion of the inner tube 10.

A rotatable ring 38 is rotatably secured to the coupling body 24 by a retaining bushing 39, which has at one end an external screw thread 40 in threaded engagement with the coupling body 24 and, at its other end, an outwardly projecting annular shoulder 41 which slidably abuts and retains an annular internal projection 42 on the rotatable ring 38. The rotatable ring 38 is also formed with an internal ring 38 is also formed with an internal screw thread 43 for threaded engagement with the male coupling 22, as described below.

Resilient sealing rings 44 and 45 are provided at the front of the coupling body 24 for sealing engagement with the male coupling 22.

Figure 7:
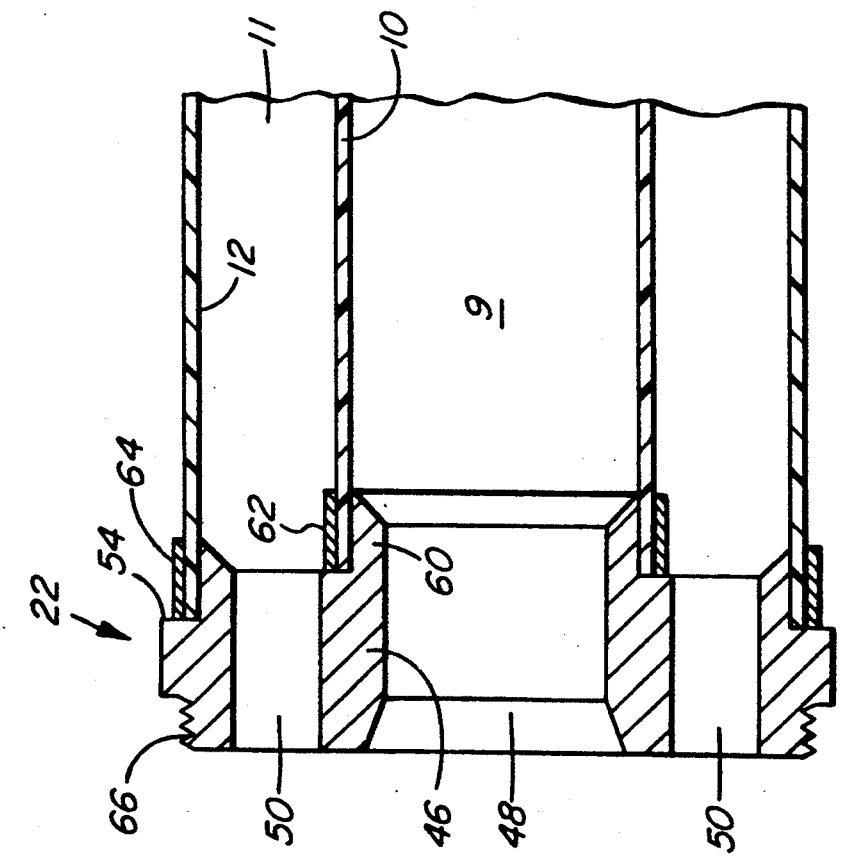
FIGS. 6 and 7 show views in end elevation and in longitudinal cross-section, respectively, of a male coupling for the hose of FIGS. 1 and 2 or 3.
Figure 6:
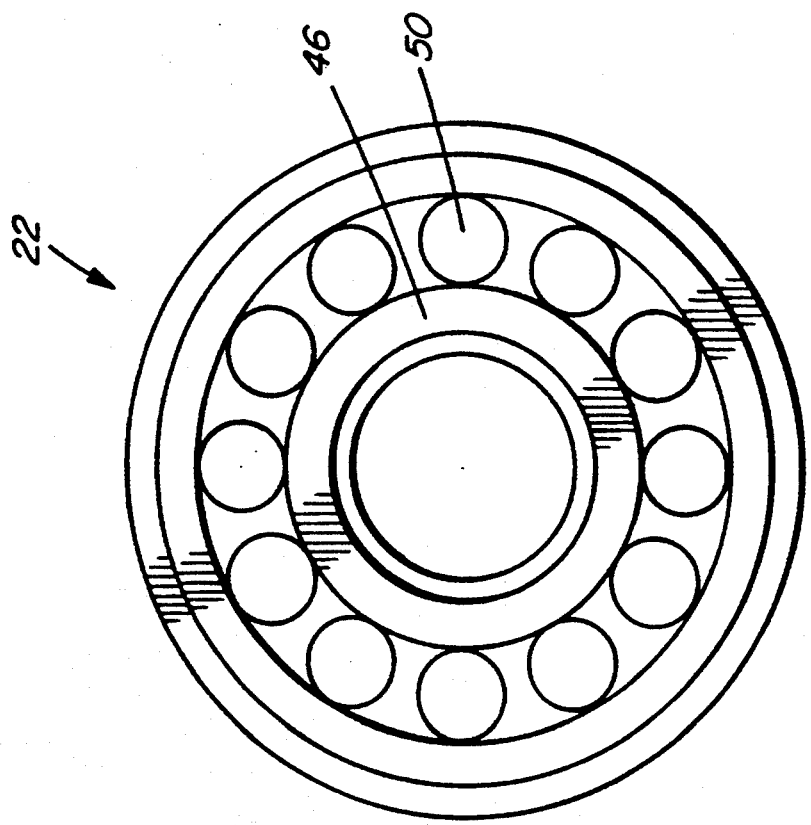

The male coupling 22, shown in FIGS. 6 and 7, has a coupling body 46 formed with a central cylindrical passage 48 and with a plurality of further passages 50 equiangularly distributed around the central passage 48, the diameter of the passage 58 being the same as that of the central passage 26 of the female coupling 22 and the diameters of the passages 50 being equal to that of the passages 28.

The male coupling 22 has a cylindrical rearward extension 60, to which the inner tube 10 of the hose 9 is secured by a crimped retainer ring 62, and a step-shaped peripheral recess 54 at which the outer tube 12 is secured by a crimped retainer ring 64.

Figure 8:
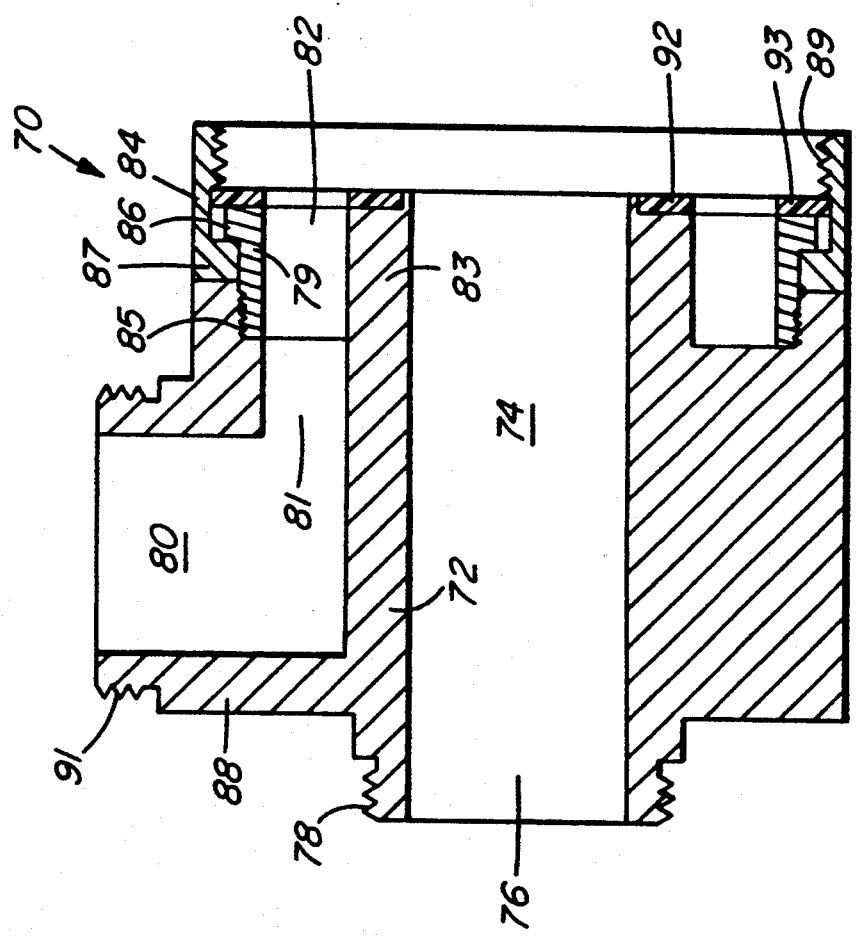
FIG. 8 shows a view in longitudinal cross-section through a pump adaptor.

The male coupling 22 also has, at its front end, an external screw thread 66, which can be screwed into engagement with the screw thread 43 of the female coupling 20 and alternatively with a coupling indicated generally by reference numeral 70 in FIG. 8.

The coupling 70 is used for introducing fluid into the outer tube 12 and has a coupling body 72 which has a central passage 74 with a rear extension 76 provided with an external screw thread 78.

The coupling body 72 also has a further passage 80 extending at right angles to the central passage 74 and communicating through a passage 81, parallel to the passage 74, with an annular passage 82 which extends around the central passage 74.

The annular passage 82 is defined by the outer surface of a cylindrical forward extension 83 of the coupling body 72 and the internal surface of a bushing 79. A rotatable ring member 84 is rotatably retained by the bushing 79, which has at one and an external screw thread 85 in threaded engagement with the coupling body 72 and at its other end an outwardly projecting annular shoulder 86 in sliding and retaining abutment with an annular internal projection 87 on the ring member 84.

Figure 9:
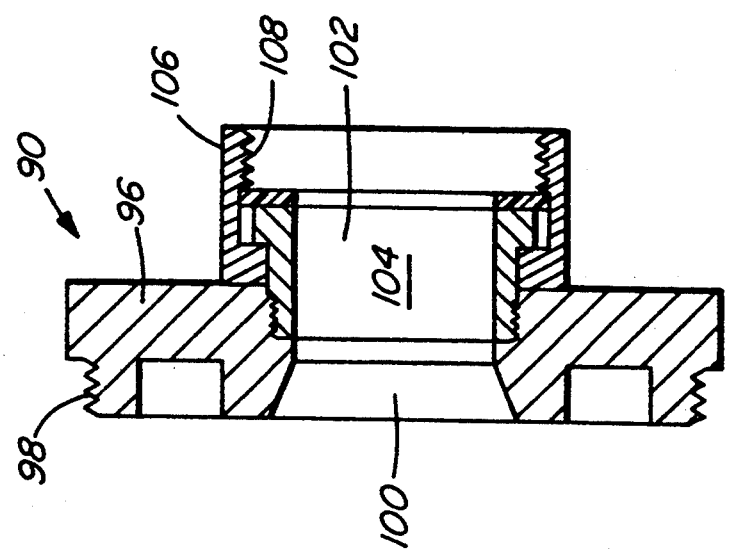
FIG. 9 shows a view in longitudinal cross-section through hydrant/sieve.

The ring member 84 has an internal screw thread 89 for threaded engagement with the screw thread 66 of the male coupling 22 or, alternatively, with a hydrant-/sieve adaptor 90 shown in FIG. 9.

The passage 80 extends through an upwardly projecting portion 88 of the coupling body 72 and the portion 88 is provided with an external screw thread 91 for connection to a female coupling (not shown) on one end of a hose or pipe (not shown), which extends to a pump (not shown).

The coupling 70 is also provided with concentric sealing rings 92 and 93 for sealing around the passages 74 and 82.

The adaptor 90 can serve as an end closure for the internal space 11 and has an adaptor body 96 formed with an external screw thread 98 for threaded engagement with the ring member 38 of the coupling 20, and a central opening 100 communicating through a central passage 102 in a bushing 104.

The bushing 104 is in threaded engagement with the adaptor body 96 and retains a rotatable connecting member 106 having an internal screw thread 108 for connection to a hose (not shown) or the like.

When secured to the female coupling 20, the adaptor 90 closes the passages 28 and, thus, the intermediate space 11.

When the hose 9 is in use, the male coupling 22 is coupled to the coupling 70 of FIG. 8 and a fluid under pressure, for example water from a fire truck pump, is then supplied through the passages 80, 81 and 82 of the coupling 70 to the space 11 between the inner and outer tubes 10 and 12 at one end of the hose 9, thus causing the outer tube 12 to be inflated. This fluid is prevented from escaping at the other end of the hose 9 by the adaptor 90.

As the outer tube 12 is inflated from a collapsed position, the retainer members 14 pull the inner tube 10 from its collapsed position into the expanded position in which it is shown in Figs. 1 and 2. This expansion of the inner tube 10 can be employed to suck water into the inner tube as it expands. Consequently, the hose is self-priming.

However, when the hose is not in use, the flexibility of the inner and outer tubes 10 and 12, and of the retainer members 114, allow the entire hose to be collapsed into a flattened, compact condition, so that it can be conveniently transported and stored.

It is a further advantage of the present hose that it is relatively tolerant of minor defects, as compared to conventional suction hoses. More particularly, even a very small puncture in a conventional hose will allow air into the hose, thereby destroying or severely limiting the suction that can be generated through the hose. With the present hose, however, if the liquid being sucked through the inner tube 10 is the same as that which is introduced between the inner tube 10 and the outer tube 12 for inflating the latter, then a leak through the inner tube 10 will require more liquid to be pumped into the outer tube 12, between the tubes 10 and 12, but the suction within the inner tube 10 will not be lost.

As will be apparent to those skilled in the art, various modifications may be made in the above-described embodiments of the present invention, within the scope of the present invention as defined by the appended claims.

I claim:

1. A suction hose, comprising:
   a collapsible outer tube of flexible material;
   a collapsible inner tube of flexible material extending along the interior of said outer tube;
   said outer tube having a diameter which is sufficiently greater than that of said inner tube to provide an intermediate space between said inner and outer tubes upon inflation of said outer tube;
   an inlet communicating with said intermediate space through which a pressurized fluid is supplied thereto for inflating said outer tube and thereby creating a suction within said inner tube by expanding the inner tube from a collapsed condition;
   a plurality of tensile retainer members extending between and connected to said inner and outer tubes so as to expand said inner tube from its collapsed condition in response to the inflation of said outer tube;

said retainer members being flexible to allow said hose to collapse on deflation of said inner and outer tubes;

couplings at opposite ends of said hose for connecting the opposite ends of said hose to similar hoses;

said couplings each having a central passage communicating with the interior of said inner tube and an outer passage communicating with said intermediate space between said inner and outer tubes; and an end closure for closing said intermediate space at one end of said hose;

said end closure being realisably interengageable with one of said couplings and having body shaped to close the outer passage thereof; and said body having a central passage for communication with the interior of said inner tube to allow fluid to flow through said end closure from said inner tube.

2. A hose as claimed in claim 1, further comprising an adaptor for connecting one end of said hose to a source of fluid under pressure, said adaptor having a central passage for communicating with the interior of said inner tube, a further passage extending at right angles to said central passage for communicating with said intermediate space, and a screw thread around said outer passage for use in connecting said adaptor to the source of fluid under pressure.

* * * * *